United States Patent [19]
Lore et al.

[11] 3,721,346
[45] March 20, 1973

[54] DESTRUCTIVE DISTILLATION OF DOMESTIC SEWAGE

[76] Inventors: Raymond J. Lore, 1884 N.W. North River Drive; Carl W. Draudt, Jr., 2525 N.W. 18th Terrace, both of Miami, Fla. 33125

[22] Filed: June 1, 1971

[21] Appl. No.: 148,641

[52] U.S. Cl. ................210/121, 210/152, 210/180, 210/181
[51] Int. Cl. .............................................C02c 1/00
[58] Field of Search..........210/12, 64, 121, 152, 180, 210/181

[56] References Cited

UNITED STATES PATENTS 2,938,630   5/1960   Novak ............................210/177 X Primary Examiner—Michael Rogers
Attorney—Salvatore G. Militana

[57] ABSTRACT

Disclosed is a system and method for the destructive distillation of domestic wastes by the flash evaporation of a liquid resulting from domestic waste materials from which sediment has been removed and biological reduction and liquefaction effected through a plurality of stages incorporated in a septic tank. When a designated quantity of effluent has been provided thereby, a level sensing device actuates the heating elements of a reactor type furnace which on reaching a certain temperature actuates a pump that directs the flow of accumulated effluent to the furnace wherein the effluent is first preheated, then discharged into a reactor to effect the flash evaporation of the effluent and its discharge as a vapor from the furnace.

2 Claims, 5 Drawing Figures

INVENTORS
RAYMOND J. LORE
CARL W. DRAUDT Jr.

3,721,346

DESTRUCTIVE DISTILLATION OF DOMESTIC SEWAGE

BACKGROUND OF THE INVENTION

There are certain areas wherein the conventional accepted manner of disposing domestic sewage or waste material either cannot be properly effected or for economic reasons are not properly processed as required by statute or by good ecological reasoning. One such area is in airplanes, marine and mobile homes where permanent connections to sewage systems are not possible.

Also, in many sections of the country where there is no public sewerage system, the character of the soil as a drain field may prevent the proper functioning of a septic tank system, the land being either all clay, rock or too marshy to permit the necessary percolation of effluent through the soil to properly purify and clarify same so as not to cause a pollution problem.

At the present time disposal devices are available to those that are unfortunate in not having a proper sewerage or septic tank system in which to dispose their domestic waste materials. These disposal devices consist of holding tanks in which the waste material may be chemically treated as by chlorination, etc. macerated, incinerated, evaporated or dehydrated. None of these devices are completely adequate since all of them are of limited capacity, some are malodorous, others have by-products such as solids that have to be disposed of and all of them are expensive in cost and require more than ordinary attention.

SUMMARY

The present invention contemplates avoiding all of the above indicated objections to the use of the conventional domestic waste disposal devices, and therefore has as its principal object the provision of a method and system for disposing domestic sewage by an automated self-contained compact thermal reaction unit that results in the complete destruction of bio-reducible human waste and the non-bio-reducible effluents thereof.

Another object of the present invention is to provide an effluent treatment system having a septic tank in which human waste is received; sedimentation and biological reduction processes take place and upon liquification the effluent, is collected in a metering device until a certain quantity causes the heating of a reactor type furnace and the pumping of the effluent into the reactor wherein the liquid is flash vaporized and may be vented into the atmosphere or returned to sterile liquid form.

A further object of the present invention is to provide the destructive distillation of domestic waste wherein there is no resulting pollution contamination of the atmosphere streams or the ground.

A still further object of the present invention is to provide a system for the destructive distillation of human waste which is automatic in operation, but will only operate when a certain designated level of effluent has been collected in a telemetering or liquid receptacle and upon emptying the telemetering receptacle the system shuts down until the former is again filled with effluent and the cycle of operation again commences.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims. In the drawings:

DESCRIPTION OF THE PREFERRED EMBODIMENT

Figure 1:
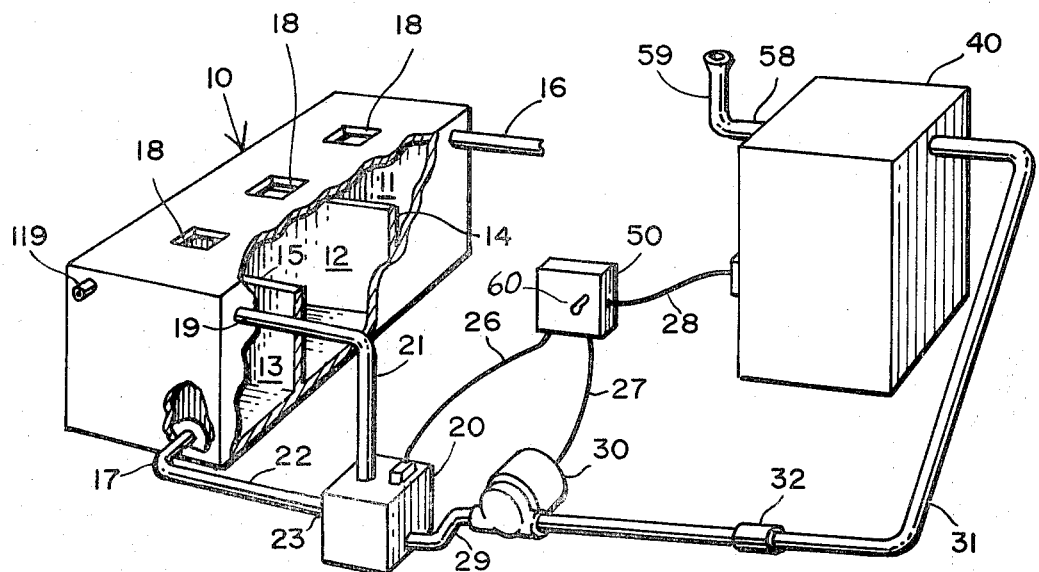
FIG. 1 is a perspective of our system for the destructive distillation of domestic sewage with parts broken away.
Figure 4:
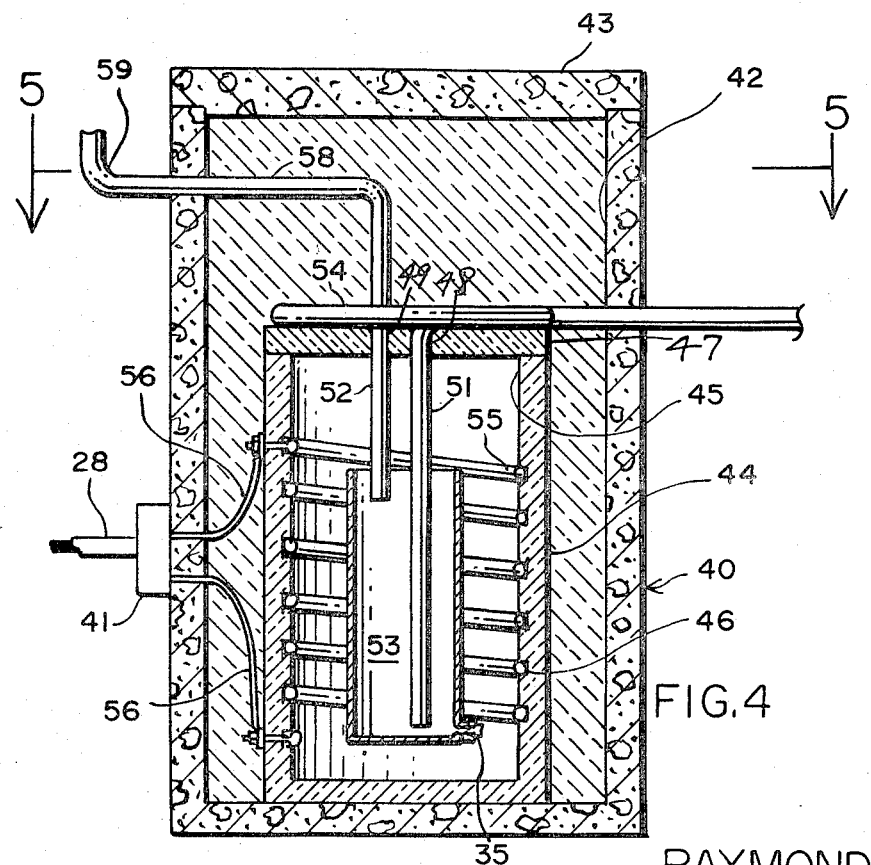
FIG. 4 is a cross sectional view of the electric furnace.
Figure 2:
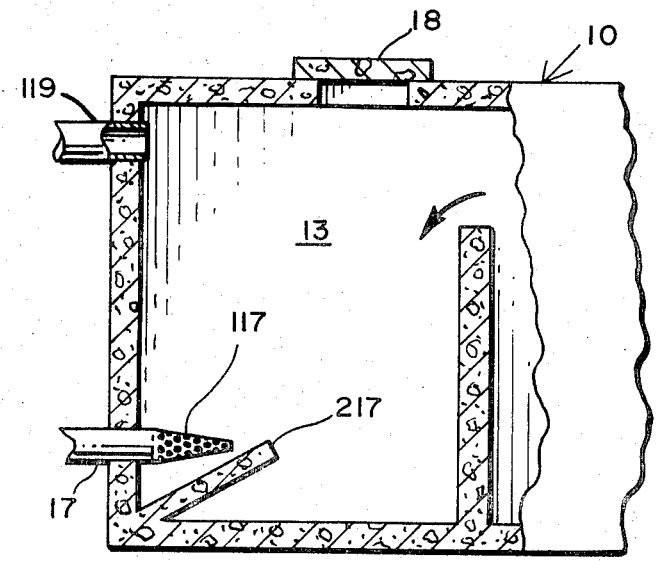
FIG. 2 is a fragmentary cross sectional view of the discharge chamber of the septic tank.
Figure 3:
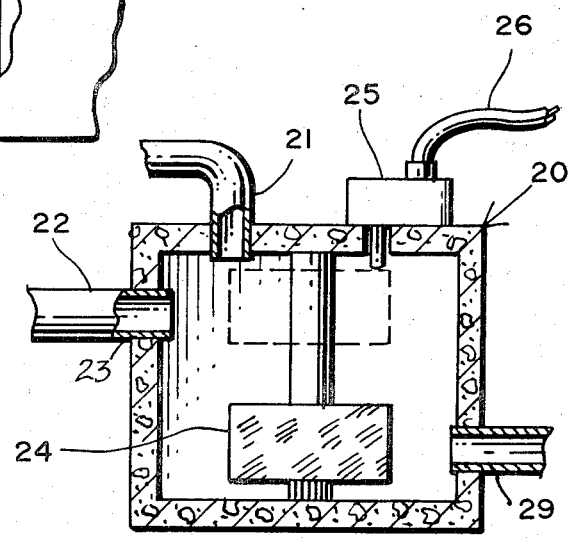
FIG. 3 is a cross sectional view of the telemetering device.
Figure 5:
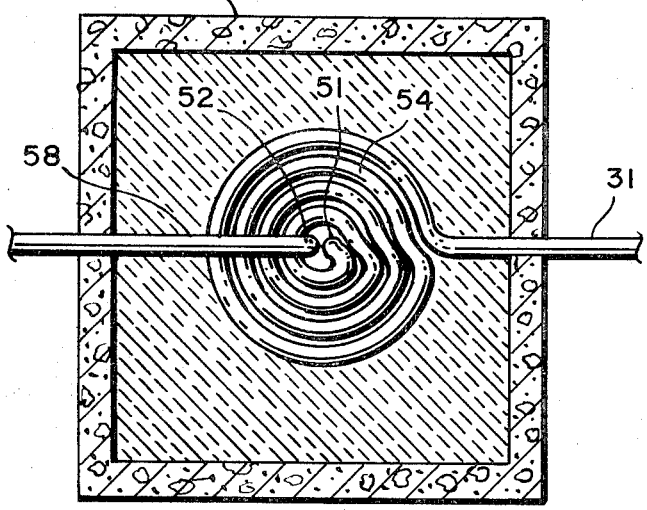
FIG. 5 is a cross sectional view taken along the line 5—5 of FIG. 4.

Referring to the drawings wherein like numerals are used to designate similar parts throughout the several views, our waste disposal system consists generally of a combination septic and sedimentation tank 10, a liquid collecting telemetering device 20, a metering pump 30, a flash type furnace 40 and a solid state control device 50, all of which are interconnected as indicated hereinafter to receive household waste matter and finally discharge sterile, odorless and uncontaminated vapor into the atmosphere.

The septic tank 10 which is preferably constructed of stainless steel or other suitable material consists of a plurality of compartments, preferably three in number, namely, compartments 11, 12 and 13 separated by laterally extending baffles 14 and 15, which terminate in spaced relation to the top wall of the tank 10 to permit the overflow of influent from compartment 11 to compartment 12 and then to compartment 13.

An inlet pipe 16 for domestic sewage communicates with the upper portion of the chamber 11 while an outlet pipe 17 is connected to the lower portion of the chamber 13. Each of the chambers 11, 12 and 13 are provided with covered inspection openings 18 which also permit the cleaing or removal of sediment when necessary from the various compartments. The compartment 13 is further provided with a first vent opening 19 which is connected to the telemetering device 20 by means of a pipe 21 and a second vent opening 119 that communicates with the atmosphere to dispel the gases created during the anaerobic decomposition of the solid waste matter in its conversion to a liquid state.

The inner end of the outlet pipe 17 is provided with a conical shaped filter or screen element 117 to prevent the discharge of solid material therethrough. Adjacent thereto and extending at an oblique angle is a gas baffle or deflector 217 that prevents the gases created therein from being discharged into the outlet pipe 17 but will instead rise to the top portion of the chamber 13 and be discharged into the atmosphere by way of the open vent 119.

The outlet 17 of the septic tank 10 is connected to the telemetering device 20 by a pipe 22 that extends to an inlet 23, the telemetering device 20 being positioned at a lower level than the bottom of the septic tank 10 so that flow of liquid from the chamber 13 is effected by gravity. Within the telemetering device 20 is a float 24 which engages a conventional float switch 25 mounted in the telemetering device 20 when a certain amount of liquid has accumulated in the telemetering device 20. The float switch 25 is connected by an electric conductor 26 to the control panel 50 which in turn is connected to a source of electricity (not shown). Further electric conduits 27 and 28 extend from the control panel 50 to the pump 30 and a terminal box 41 mounted on the furnace 40 so as to be capable of actuating the pump 30 and furnace 40 at the appropriate times as is explained in detail hereinafter.

The pump 30 is connected to the telemetering device 20 by a pipe 29 to permit the liquid in the telemetering device 20 to be evacuated and pumped through a pipe 31 which extends into the furnace 40. A check valve 32 is mounted in the pipe line 31 to prevent the reverse flow of liquid therethrough.

The furnace 40 consists of an outer shell forming a chamber 42 enclosed by a cover member 43. Within the chamber 42 is an electric furnace 44 constructed of refractory brick to form a heat chamber 45 and whose inner surface is grooved as at 46 in a spiral shape extending from the bottom to adjacent the top of the electric furnace 44. Within the open spiral groove 46 extends a heating coil 55. A cover 47 which encloses the heat chamber 45 is provided with openings 48 and 49 for receiving pipes 51 and 52 that extend to a reactor or flash receptacle suspended in the heat chamber 45. The pipe 51 extends to the bottom portion of the reactor 53 and is connected at its outer end to a preheating coil 54 mounted on the electric furnace 44 and extends through the chamber 42 and the furnace 40 to connect with the pipe 31. The electric wire 28 which extends to the terminal box 41 is connected to wires 56 that extend to the ends of the heating coil 55. The spaces between the furnace shell 40 and the electric furnace 44 are filled with insulation to prevent loss of heat during the operation of the electric furnace 44. The pipe 52 is connected to a pipe 58 that extends through the shell of the furnace 40 is provided with a vent 59 that will discharge the resulting vapors into the atmosphere.

It is to be noted that if found preferable, the pipe 58 may be connected to further pipe (not shown) that permits the cooling of the vapors and conversion thereof to water for reuse.

In the normal operation of our system for the destructive distillation of household sewage, waste materials will flow through the pipe 16 into the first compartment 11 of the septic tank 10 where most of the sediment contained in the waste fluids will settle to the bottom of the chamber 11 later to be cleaned out by way of the opening 18. At the same time the biological reduction process commences and continues upon flowing into chamber 12 over the baffle 14. In this second chamber 12, the biological reduction process will have converted the waste materials to liquid form and the remainder of the sediment therein will have been deposited in the bottom of the chamber 12, so that the liquid overflowing the baffle 15 into the third chamber 13 will be approximately colorless and with little or no sediment therein as the level of effluent rises in the chamber 13 above the level of the outlet 17, it flow through the filter 117 by gravity through the pipe 22 and into the telemetering device 20. The gas baffle 217 prevents any gases formed in the chamber 13 from entering the discharge outlet 17, but instead directs the gases away from the filter 117 towards the top of the chamber 13 where the gases are vented into the atmosphere through the vent 119.

When sufficient effluent has accumulated in the telemetering device 20 to cause the float 24 to rise therein and actuate the float switch 25, the control panel 50 relays (not shown) will first cause the electricity to flow through the wires 28 to heat the heating coils 55 until a certain desired tempeature has been reached. Then the relays will cause electricity to flow through wires 27 to actuate the pump 30 which will then force the flow of effluent from the telemetering device 20 through the pipe 31 past the check valve 32 and into the preheating coils 54. The preheated effluent now flows into inlet pipe 51 where the liquid is deposited into the reactor 53 where the liquid is instantaneously converted into a vapor by flash action due to the intensity of the heat of approximately 900° F. The vapors then rise in the reactor 53 and are discharged through the pipe 52, 58 and vented into the atmosphere at the vent opening 59. These vapors will, of course, be sterile and practically odorless. If it is not desired that vapors be discharged into the atmosphere, they may be condensed and the liquid resulting thereby may be accumulated for reuse or discharged as desired. The resulting liquid will be colorless and free of bacteria though may not be potable. Since the vaporization of water results in the settling of salts, chlorides, etc. in the bottom of the reactor, the reactor 53 is provided with a cleaning port 35, to remove same. After the effluent in the receptacle or telemetering device 20 has been completely evacuated therefrom the float switch 25 will open the circuit to the control panel 50 to shut down the motor 30 and deenergize the heating coils 55, until the effluent again collects and reaches the designated level in the telemetering device 20 to actuate the float switch 25 as explained hereinbefore.

The control panel 50 is provided with a conventional toggle on and off switch 60 which is available to deactuate the system in the event it is decided to render the system inoperative for any reason.

What we claim as new and desire to secure by Letters Patent of the United States is:

1. A system for the destructive distillation of domestic waste matter comprising of a septic tank, a baffle member extending laterally across said septic tank forming a plurality of compartments communicating at the upper portion of said baffle member, a waste inlet mounted at the upper portion of one of said compartments and a liquid effluent outlet mounted at a lower portion of the other of said compartments, a filter mounted on said outlet, an effluent collecting receptacle, pipe means connecting said receptacle and said outlet permitting gravity flow of effluent from said other of said compartments to said effluent collecting receptacle, float means mounted in said receptacle, switch means operable by said float means upon the rising of said float means in said effluent collecting receptacle, heat generating means, reactor means having a vent mounted in said heat generating means and pump means connecting said effluent collecting receptacle and said reactor means whereby upon actuation of said switch means by said float means, said heat generating means is actuated and said pump means discharges said effluent from said receptacle to said reactor to vaporize said effluent and discharge said vapor through said vent.

2. The structure as recited by claim 1 wherein said heat generating means comprises a chamber having walls constructed of refractory materials, a cover removably mounted on said walls, a heating coil mounted along the inside surfaces of said refractory material extending substantially along the full height of said chamber in a spiral configuration and said reactor means having a chamber and an inlet extending to the lower portion of said chamber whereby radiated heat from said heating coils effects the evaporation of said effluent.

* * * * *